United States Patent
Neoh et al.

(10) Patent No.: US 7,473,445 B2
(45) Date of Patent: *Jan. 6, 2009

(54) PHOTOINDUCED CONVERSION OF POLYANILINE FROM AN INSULATING STATE TO A CONDUCTING STATE

(75) Inventors: Koon Gee Neoh, Singapore (SG); En-tang Kang, Singapore (SG); Sock Wee Ng, Singapore (SG); Jeyagowry T. Sampanthar, Singapore (SG)

(73) Assignee: The National University of Singapore, Singapore (SG)

( * ) Notice: Subject to any disclaimer, the term of this patent is extended or adjusted under 35 U.S.C. 154(b) by 757 days.

This patent is subject to a terminal disclaimer.

(21) Appl. No.: 09/895,153

(22) Filed: Jul. 2, 2001

(65) Prior Publication Data
US 2002/0031616 A1 Mar. 14, 2002

(30) Foreign Application Priority Data
Jul. 4, 2000 (SG) .................. 2000 03691

(51) Int. Cl.
C08F 2/48 (2006.01)
B05D 5/12 (2006.01)
B05D 1/36 (2006.01)
B05D 7/00 (2006.01)
B05D 3/06 (2006.01)

(52) U.S. Cl. ............. 427/508; 427/58; 427/372.2; 427/407.1; 427/520; 427/558

(58) Field of Classification Search ............... 427/558, 427/553, 508, 58, 520, 372.2, 407.1; 428/411.1
See application file for complete search history.

(56) References Cited

U.S. PATENT DOCUMENTS

| | | | | |
|---|---|---|---|---|
| 3,754,055 A * | 8/1973 | Rembaum | ............... | 260/879 |
| 4,112,207 A * | 9/1978 | Jones | ............... | 526/17 |
| 4,211,621 A * | 7/1980 | Porter | ............... | 204/157.1 |
| 4,234,623 A * | 11/1980 | Moshtev et al. | ............... | 427/54.1 |
| 4,414,080 A * | 11/1983 | Williams et al. | ............... | 205/340 |
| 4,455,233 A * | 6/1984 | Pohl et al. | ............... | 210/635 |
| 4,750,817 A | 6/1988 | Sammells | ............... | 359/270 |
| 4,796,971 A * | 1/1989 | Robello et al. | ............... | 385/11 |
| 4,875,762 A * | 10/1989 | Kato et al. | ............... | 359/241 |
| 5,016,063 A * | 5/1991 | Beratan et al. | ............... | 357/8 |
| 5,068,062 A * | 11/1991 | Inata et al. | ............... | 252/518 |
| 5,141,717 A * | 8/1992 | McRae | ............... | 422/82.01 |

(Continued)

FOREIGN PATENT DOCUMENTS

EP 0 995 786 A1 4/2000

(Continued)

OTHER PUBLICATIONS

IBM Technical Disclosure Bulletin, Oct. 1979.*

(Continued)

*Primary Examiner*—Elena T Lightfoot
(74) *Attorney, Agent, or Firm*—Birch, Stewart, Kolasch & Birch, LLP

(57) ABSTRACT

An electrically conductive polymeric article exhibiting enhanced conductivity including a polymeric material capable of exhibiting electrical conductivity;

the polymeric material being rendered electrically conductive by treatment with UV or near UV irradiation in the presence of a viologen salt.

14 Claims, 2 Drawing Sheets

U.S. PATENT DOCUMENTS

| | | | | |
|---|---|---|---|---|
| 5,232,574 A | * | 8/1993 | Saika et al. | 204/418 |
| 5,397,686 A | * | 3/1995 | Dominick et al. | 430/346 |
| 5,471,338 A | | 11/1995 | Yu et al. | 359/273 |
| 5,498,336 A | * | 3/1996 | Katsurada et al. | 210/496 |
| 5,729,379 A | * | 3/1998 | Allemand et al. | 359/270 |
| 5,776,370 A | * | 7/1998 | Afzali-Ardakani et al. | 252/500 |
| 5,989,717 A | | 11/1999 | Allemand et al. | 428/426 |
| 6,040,017 A | * | 3/2000 | Mikhael et al. | 427/496 |
| 6,083,355 A | * | 7/2000 | Spence | 204/164 |

FOREIGN PATENT DOCUMENTS

| | | | |
|---|---|---|---|
| FR | 2563229 A | | 10/1985 |
| JP | 56026977 A | * | 3/1981 |
| JP | 01-230691 A | | 9/1989 |
| JP | 03-152183 A | | 6/1991 |
| JP | 06-102540 A | | 4/1994 |
| JP | 6102540 A | | 4/1994 |
| JP | 07-301828 A | | 11/1995 |

OTHER PUBLICATIONS

IBM Technical Disclosure Bulletin, Feb. 1, 1975.*

Derwent Abstract Accession No. 85-305185/49, FR 2563229 A (Commiss Energie Atomique) Oct. 25, 1985 (See abstract).

* cited by examiner

PHOTOINDUCED CONVERSION OF POLYANILINE FROM AN INSULATING STATE TO A CONDUCTING STATE

This nonprovisional application claims priority under 35 U.S.C. §119(a) on Patent Application No. 2000 03691-3 filed in Singapore on Jul. 4, 2000, which is herein incorporated by reference.

FIELD OF THE INVENTION

The present invention relates to a method of preparing an electrically conductive polymeric material by treatment with a viologen salt under UV-light irradiation and to electrically conductive polymeric articles formed thereby.

DESCRIPTION OF THE RELATED ART

In recent years electrically conductive polymers have been widely studied because of their important commercial applications. Such polymers include polypyrrole and its derivatives and polyaniline and its derivatives.

The aniline family of polymers is an example of one of the most widely studied electroactive polymers because of the ease of synthesis and the unusual nature of its electrical conductivity which can be varied over a wide range. Polyaniline (PANi) in its insulating base form is readily soluble in N-methylpyrrolidinone and can be cast into films or coated on different substrates. The insulating form can be converted to the conductive form by the following methods:

(1) Treatment with Aqueous Protonic Acids

PANi in the emeraldine (50% oxidized) base state when treated with protonic acids shows an increase in electrical conductivity. The resulting conductivity is a strong function of the pH of the equilibrating solution. For example, when aqueous HCl is used at pH greater than 4, the PANI remains as the essentially insulating non-protonated form whereas at pH~0 (i.e. with 1 M HCl), the conductivity increases by 10 orders of magnitude (J. C. Chiang and A. G. MacDiarmid, *Synth. Met.* 13, 193 (1986)). In the latter case, the imine units of the PANI are protonated to give a $N^+/N$ ratio of about 0.5. In this form of doping, there is no change in the number of electrons in the PANi chains.

The electrical conductivity of the PANi treated with protonic acids depends not only on the pH of the equilibrating solution but also on the oxidation state of the PANi. For example, PANi in the leucoemeraldine (100% reduced, 0% oxidized) state shows only a small increase in conductivity when treated with protonic acids (J. C. Chiang and A. G. MacDiarmid, *Synth. Met.* 13,193 (1986)).

(2) Charge Transfer Interaction with Organic Electron Acceptors

PANi in the emeraldine base state can undergo charge transfer interaction with organic electron acceptors such as tetrachloro-o-benzoquinone and 2,3-dichloro-5,6-dicyano-p-benzoquinone in acetonitrile (S. H. Khor, K. G. Neoh and E. T. Kang, *J. Appl. Polym. Sci.* 40, 2015 (1990)). An increase in electrical conductivity is achieved and the magnitude of the conductivity is dependent on the type of organic acceptors and acceptor concentration. The charge transfer interaction of emeraldine base with the organic electron acceptor is analogous to that of protonation by HCl, with the hydrogen atoms in the latter replaced by the partially dehalogenated halobenzoquinone rings. The maximum conductivity achieved is at least an order of magnitude lower than that achievable by protonic acid doping of emeraldine base.

PANi in the leucoemeraldine state undergoes oxidation doping by organic electron acceptors in acetonitrile solution which involves first the oxidation of the amine nitrogen and also the formation of the imine structure through hydrogen transfer from the amine nitrogen to the acceptor. The so-produced imine nitrogen is then in turn doped by the acceptor, as described above for PANi in the emeraldine state (E. T. Kang, K. G. Neoh, T. C. Tan, S. H. Khor, and K. L. Tan, *Macromolecules.* 23, 2918 (1990)). The maximum electrical conductivity obtained is also about an order of magnitude lower than that obtained by protonic acid doping of emeraldine.

It would be a significant advance in the art if a method of preparing an electrically conductive polyaniline material could be provided which would function irrespective of the oxidation state of the polyaniline. It would be a further significant advance in the art if a method could be provided which did not involve the use of acid or other aqueous media or organic solvents such as acetonitrile. It would be a still further advance in the art if the level of conductivity achieved would be enhanced and particularly if the conductivity path can be tailored by selective treatment.

SUMMARY OF THE INVENTION

It is accordingly an object of the present invention to overcome, or at least alleviate, one or more of the difficulties and deficiencies related to the prior art. Applicants have recently shown that PANi base in the form of freestanding film, coating or powder can be converted to the doped state upon exposure to the aqueous viologen solution under ambient conditions. The reactions involve the transfer of electrons from PANi to the viologen dications resulting in the formation of viologen cation radicals and the transfer of some of the halide ions initially associated with the viologen to the PANi. This form of oxidative doping of PANi offers the advantage of the use of near-neutral aqueous medium rather than a strongly acidic medium or organic solvent as in the prior art described above. Accordingly, in a first aspect of the present invention there is provided a method for producing an electrically conductive polymeric material. The method can be performed by irradiating a pre-doped composition of the polymeric material and a viologen or viologen salt with electromagnetic radiation thus producing an electrically conductive polymeric material. The electromagnetic radiation preferably includes one or more of UV or near UV wavelengths. Another aspect of the invention is an electrically conductive polymeric article including a polymeric material exhibiting electrical conductivity that is produced by the method.

In the method of the present invention a polymeric material is rendered electrically conductive by treatment with a source of electromagnetic radiation, e.g. UV or near UV irradiation, in the presence of a viologen salt. An article produced using the method of the invention can have a pathway of electrical conductivity patterned upon it by appropriately patterning the irradiation of the material.

DETAILED DESCRIPTION OF THE INVENTION

Figure 1:
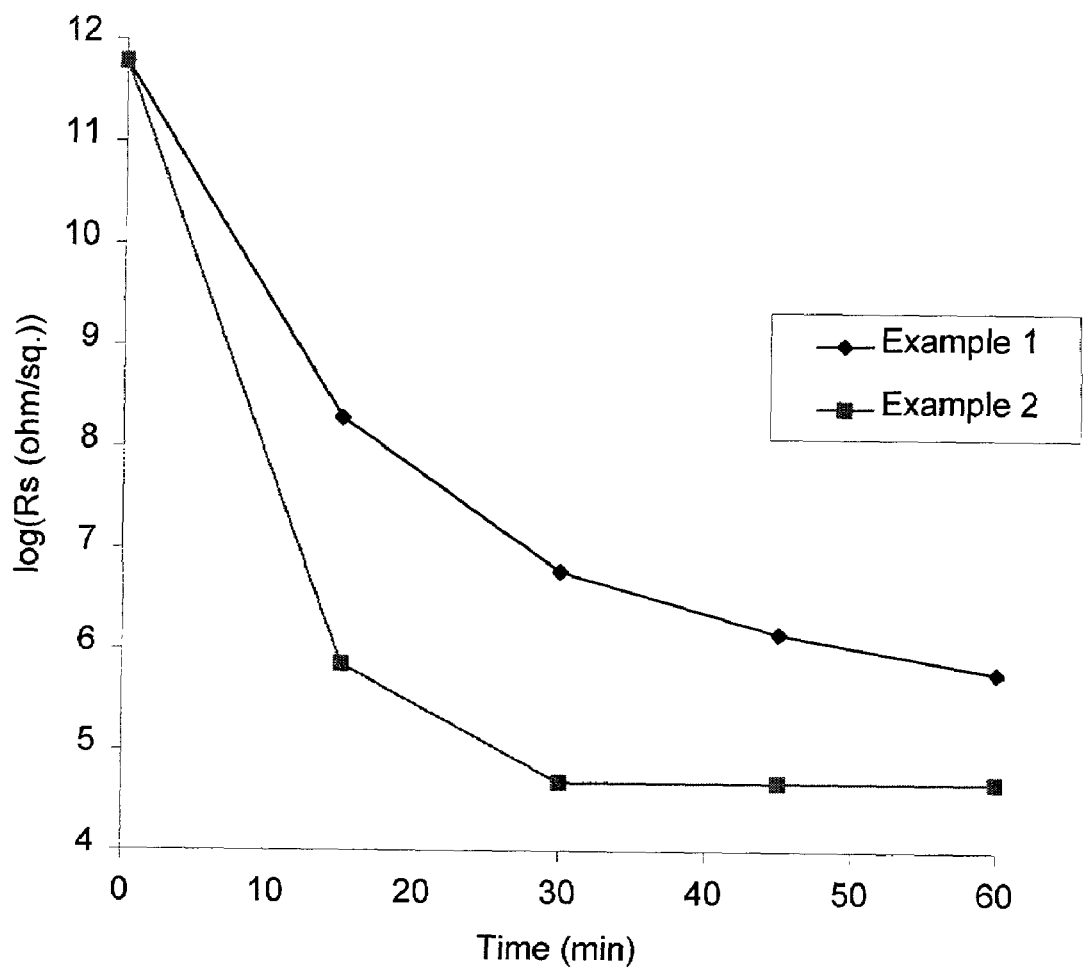
FIG. 1 shows the decrease in the sheet resistance over time of near UV irradiation of two different polyaniline films (Examples 1 and 2).

It has surprisingly been found that the electrically conductive polymeric article formed according to the present invention exhibits a high level of electrical conductivity. For example, an electrically conductive polymer may be prepared with resistances (Rs) decreasing from approximately $10^{10}$ to approximately $10^5$ Ω/sq or below, irrespective of the oxidation state of the polymer material. Thus, e.g. a polyaniline material may be in the leucoemeraldine (0% oxidation) or nigraniline (75% oxidation) states or in any oxidation state between these two states, including emeraldine (50% oxidation).

Further, it will be understood that a conductivity path may preferably be constructed in a selected pattern dictated by a radiation treatment pattern. The radiation treatment can be patterned either by tracking a focused light beam of appropriate wavelength, such as a laser or a collimated beam from a mercury lamp, along a desired path or by irradiating an area that has been masked. Techniques for patterned irradiation of materials are well-known in the art of photolithography.

Examples of polymeric materials capable of being rendered electrically conductive by treatment with a viologen salt include polymers derived from aromatic bases such as aniline and its derivatives and from heterocyclic bases such as pyrrole and its derivatives. Other polymers which may be used may be selected from the group of substituted and unsubstituted polyanilines, polyparaphenylenvinyls, substituted and unsubstituted polythiophenes substituted and unsubstituted poly-p-phenylene sulfides, substituted polyfuranes, substituted polypyrroles, substituted polyselenophene, polyacetylenes formed from soluble precursors, combinations thereof and blends thereof with other polymers.

Preferred polymeric materials for inclusion in the polymeric articles of the invention include polyaniline and its derivatives and polypyrrole and its derivatives. Polyaniline and polypyrrole are particularly preferred polymeric materials.

The electrically conductive polymeric article may be formed in any suitable manner and may take any suitable shape. The polymeric article may be in the form of a film, e.g. a free standing film, a film coating, e.g. a thin film coating, or a powder. Methods for forming polymeric articles into various shapes, including films and thin films, are well-known in the art.

In a preferred aspect, the polymeric material may be deposited or supported on a suitable substrate. The substrate may be a fabric, polymeric matrix film or other construct. A polyethylene substrate, e.g. a low density polyethylene (LDPE) substrate may be used.

The viologen salt utilized as a dopant for the polymeric material may be of any suitable type. Viologen salts such as a dihalide salt of a viologen (1,1'-disubstituted 4,4'-bipyridinium) have been found to be particularly suitable.

The substituents on the bipyridinium molecule may be selected from alkyl or aryl groups. The alkyl groups may be substituted or unsubstituted C1 to C4 alkyl groups. The alkyl groups may be straight or branched chains. Substituents for the alkyl groups may be selected from a wide range of substituents including halogen, phenyl and substituted phenyl. Phenylmethyl (benzyl) groups are the preferred alkyl substituents. The aryl groups may be substituted or unsubstituted aryl or heteroaryl.

Viologen salts may be provided as free compounds, shown below as I or in the form of polymers, shown below as II and III,

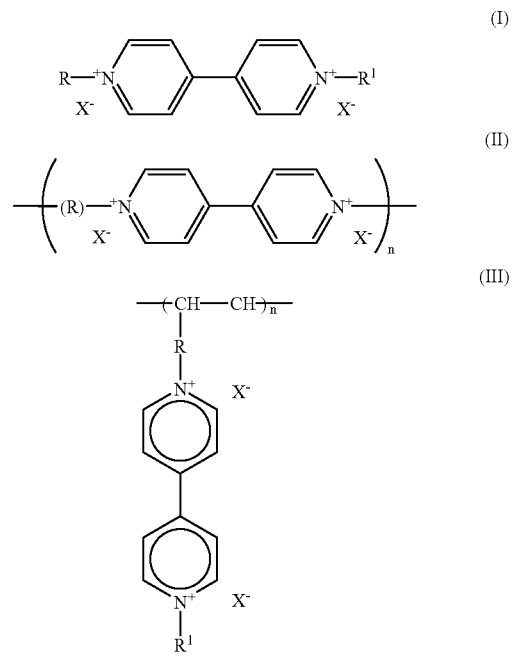

where:

R and $R^1$ are independently chosen from alkyl or aryl groups as indicated above;

$X^-$ is an anion, preferably a halide ion; and n is an integer greater than or equal to 2.

In a preferred aspect of the present invention the polymeric material is rendered conductive in a one-step reaction with a viologen salt in the presence of UV-radiation or near-UV radiation to render it electrically conductive.

Accordingly, in a preferred aspect of the present invention there is provided a method for preparing an electrically conductive polymeric article, which method includes providing
   a polymeric material capable of exhibiting electrical conductivity; and
   a viologen salt
placing the polymeric material and viologen salt in contact to form
   a pre-doped material; and
subjecting the pre-doped material to electromagnetic radiation, e.g. UV or near UV irradiation, to render the polymeric material electrically conductive.

When the viologen salt is provided as a solution, for example when a solid polymer film is immersed in or coated with an aqueous solution of the viologen salt, it is not necessary to irradiate the reaction mixture to obtain a conductive polymer. In this case, the polymeric material is allowed to react with the aqueous solution of viologen salt for a time ranging from 10 minutes to 2 hours, preferably from 10 minutes to one hour.

When the reaction is performed in the solid state, e.g. for a viologen grafted polymer material as in Examples 1 and 2, the irradiation is preferably performed for 10 minutes to one hour, more preferably for 30 minutes to one hour.

Although not wishing to be bound by any theory of the invention, it is believed that when the polymeric material is treated with a viologen salt, and subjected to electromagnetic radiation of the appropriate wavelength, the polymeric material undergoes oxidative doping and the halide anions are incorporated into the polymer. The method may be conducted under ambient conditions or above, e.g. at or above room temperature in the presence of air. Preferably the method is conducted at a temperature of 0° to approximately 80° C. in the presence of air. Thus the use of protonic acids or aqueous or organic solvents may be avoided.

Applicants have surprisingly discovered that utilizing the method of the present invention the resistance of the polymeric material, Rs, is reduced by approximately 3 to 6 orders of magnitude within a period of 3 hours or less, usually within a period of 1 hour or less. The Rs of the areas that are not subjected to UV or near-UV irradiation will not decrease. Thus, selected areas of a sheet of the polymeric material can be irradiated to form a pattern of conductive paths in the sheet. Furthermore, variously patterned sheets can be layered to form a three-dimensional pattern of conductivity. Still further, as the degree of conductivity can be controlled by the time of irradiation, among other parameters, it is possible to create a path having varying conductivity along its length.

The rate of the reaction is dependent on the ease of the reduction of the viologen salt, e.g. a viologen dihalide, and the transfer of the anions to the polymeric material to form a doped and conductive form of the polymeric material.

A preferred embodiment of the inventive method involves the exposure of the polymer-viologen compositions in the form of thin film coatings to UV-irradiation at ambient conditions. Under such conditions, the increase in conductivity can be rapidly achieved. As noted above, the rate of formation of the conductive state is dependent on the ease of the reduction of the viologen dication and the transfer of the anion to the polymer. This is in turn affected by the intensity of the irradiation, the type and amount of viologen salt used and the manner in which the polymer, e.g. PANi, and viologen are in contact. Preferably the reactions are carried out by UV-irradiation of a composition of polymer and viologen salt which are in close contact. The reactions preferably result in a substantial degree of oxidative doping of the polymer. The polymer-viologen composition may be in the form of blends or thin film coatings on substrates.

The reactions may continue for a time sufficient to permit a substantial degree of oxidative doping of the polymeric material to be achieved.

Preferably the rate of conversion of the polymeric material to a conducting state is varied by varying one or more of the type and concentration of the viologen salt, temperature and intensity and wavelength of UV irradiation and period of exposure to UV irradiation. A preferred intensity of the irradiation is at least from 25 to 100%, more preferably from 75 to 100% of that obtained from a 1 kW mercury vapor lamp, measured at a distance of 10 cm from the lamp.

The viologen salt may be selected from any suitable materials as discussed above. A viologen dihalide is preferred. The viologen salt may be monomeric or polymeric in nature. A mixture of viologen salts may be used. Synthesis of polymeric viologens is described in P. M. S. Monk, "The Viologens: Physicochemical properties, Synthesis and Applications of Salts of 4,4'-Bipyridine", c. 1998 by John Wiley, Chichester.

Preferably, the 1,1'-substituent(s) of the viologen molecule(s) is (are) selected from alkyl or benzyl groups, or a mixture thereof. The method of contacting the surface(s) of the polymeric material with the viologen salt may vary widely, depending on the state of the polymeric material and the method selected for the reactions. A preferred embodiment of the invention utilizes direct deposition of the polymeric material as a thin coating on a substrate grafted with viologen. In one embodiment, the viologen salt is deposited on a suitable substrate. More preferably, the viologen salt is grafted onto a suitable substrate utilizing a heat and/or UV-induced treatment.

The viologen salt may, in a further preferred embodiment, be grafted onto a suitable substrate utilizing a heat and/or UV-induced treatment.

In one embodiment, the viologen is then partially or substantially completely coated with the polymeric material.

Preferably, a polymeric coating or film of the polymeric material is formed in situ. For example, a viologen coated substrate can be dipped into a polymerization mixture of the monomer precursor of the polymer material and an oxidant (e.g. Example 1). Alternatively, a coating of the polymeric material is deposited on a suitable substrate (e.g. Example 3).

The viologen salt may then be deposited on the polymer coated substrate.

In a particularly preferred form, the method includes providing
- a vinyl alkyl halide grafted low density polyethylene film substrate;
- an alkyl halide; and
- 4,4'-bipyridine;
- contacting the grafted film substrate with the 4,4'-bipyridine for a time sufficient to permit reaction therebetween; typically up to 24 hours, more typically from 10 to 20 hours, still more typically from 18 to 20 hours.

and subsequently contacting the modified grafted film substrate with the alkyl halide for a time sufficient to permit the formation of a viologen grafted film. The time for this second reaction is again typically up to 24 hours, more typically from 10 to 20 hours, still more typically from 18 to 20 hours.

The method may further include the preliminary step of providing
- a low density polyethylene film substrate;
- a solution of aniline or pyrrole;
- an oxidant, preferably ammonium persulfate; and
- an alkyl halide, preferably a vinyl alkyl halide.;
- immersing the polyethylene film substrate into the solution of aniline or pyrrole and ammonium persulfate for a period sufficient to form a polymeric coating on the substrate,
- contacting the coated substrate with the vinyl alkyl halide,
- subjecting the mixture to UV or near UV irradiation for a time sufficient to form a vinyl alkyl halide grafted substrate.

In this embodiment, the alkyl group is preferably a C1-C4 alkyl group and more preferably a C1 or C2 alkyl group. The alkyl group can be derivatized, e.g. by a phenyl ring to make a benzyl halide. The halide moiety is typically fluoride, bromide or chloride.

One simple and preferred method involves the grafting of vinyl alkyl (or substituted alkyl) halides onto argon plasma pretreated LDPE (low density polyethylene) films, reacting the films with 4,4'-bipyridine followed by a second alkyl (or substituted alkyl) halide to form viologen moieties, and finally coating a thin polyaniline film onto the viologen grafted surfaces. Preferred conditions for near UV-light induced solution grafting of the vinyl alkyl halides onto argon plasma pretreated LDPE films include a monomer concentration of between 5 vol % to 10 vol % using ethanol or propanol as solvent, and a reaction time of 1 to 2 hours. Another preferred method involves placing the monomer on the surfaces of the plasma-treated LDPE films, sandwiching the films between two quartz plates and exposing the assembly to near UV-irradiation for a period of 15 to 60 minutes at room temperature. The grafted films are subjected to prolonged washing with dimethyl-formamide (DMF) to remove unreacted monomer and homopolymer. The grafting of viologen onto the films via reaction of the films with excess 4,4'-bipyridine and further reaction with excess alkyl or benzyl halides is preferably carried out at between 40° C. and 70° C. for 10 h to 20 h each, using DMF as solvent. The viologen-grafted films are washed in DMF to remove unreacted reactants before they are immersed in a reacting mixture of aniline and oxidant for deposition of a thin PANi coating onto the substrate.

The argon plasma treatment of the LDPE film is preferably conducted for from 0.2 to 2 seconds, typically for about 1 second.

Polymer coated viologen films, in which the polymer is in the base or insulating state (in the form of emeraldine or 50% oxidation state), may be exposed to near UV-irradiation between 20 min to 120 min in the presence of air. The rate of doping of the thin polymer (e.g. PANi) films depends on the type and amount of viologen grafted onto the films, the ease of reduction of the viologen salt and intensity of the light source. The change of PANi thin film from the insulating base state (blue in color) to the conductive state (green in color) is visibly obvious, and can be quantitatively monitored by sheet resistance (Rs) measurements and/or UV-visible absorption spectroscopy.

The various articles of the scientific literature cited herein are hereby incorporated by reference in their entirety and for all purposes by such citation.

EXAMPLES

The following specific examples are provided to illustrate this invention and the manner in which it may be carried out. It will be understood, however, that the specific details given in each example have been selected for the purpose of illustration, and are not to be construed as being limitations on the scope of the invention.

Example 1

Vinyl benzyl chloride grafted film was synthesized by immersing an argon plasma pretreated LDPE film into a degassed monomer solution of 5 vol % using ethanol as solvent, and exposing the setup to near UV-irradiation for 2 h. The grafted film was subjected to prolonged washing with DMF before it was reacted with 0.024 M 4,4'-bipyridine in a water bath at 70° C. for 20 h, followed by 0.4 M benzyl chloride, again in a water bath at 70° C. for 20 h. Both reaction steps were carried out using DMF as solvent. The film was washed with DMF after both reaction steps to remove unreacted reactants. The viologen grafted film was finally immersed into a reaction mixture containing 0.10 M aniline and 0.025 M ammonium persulfate in 0.5 M $HClO_4$ for 2 h. The green polyaniline (in the emeraldine state) was undoped in 0.5M NaOH for 1 h, washed in deionized water and dried under reduced pressure. The base film was exposed to near UV-light emitted from a 1 kW mercury lamp for 1 h. The sheet resistance of the film decreased from $10^{10}$ Ω/sq. (before irradiation) to $10^5$ Ω/sq.(after irradiation). The change in Rs with respect to irradiation time is shown in FIG. 1.

Example 2

Figure 2:
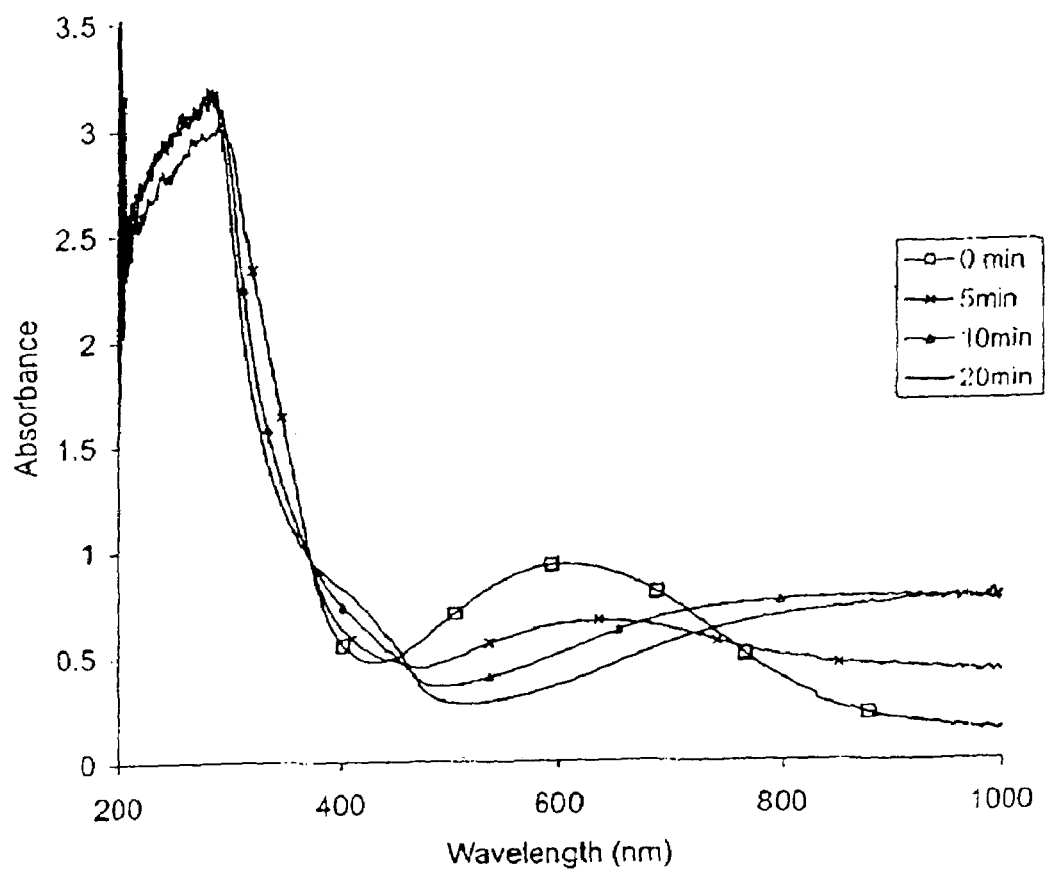
FIG. 2 shows the change in the UV-visible light absorbance spectrum of a polyaniline film over time upon near UV irradiation in contact with a viologen film (Example 2).

Vinyl benzyl chloride grafted film was synthesized as described in Example 1. The grafted film was reacted with an equimolar mixture of 4,4'-bipyridine and p-xylene dichloride (0.024 M of each reactant), in a water bath at 70° C. for 20 h, using DMF as solvent. The film so obtained was washed with hot deionized water to remove the homopolymers and coated with polyaniline as described in Example 1. The sheet resistance of the film decreased from $10^{10}$ Ω/sq. to $10^4$ Ω/sq. upon exposure to near UV-irradiation for 30 min. The change in Rs with respect to time is shown in FIG. 1. The change in UV-visible absorption spectrum from that of emeraldine base to that of the conductive salt is illustrated in FIG. 2. Before irradiation, the spectrum shows two absorption bands in the 300 nm region and at 615 nm, the first band being characteristic of emeraldine base and viologen, while the second band is the exciton band of emeraldine base. After 20 min of near UV-irradiation, the 420 nm band and the high intensity tail extending into the near IR region are characteristic of the polaron state of doped PANi.

Example 3

A coating of polyaniline (emeraldine) on LDPE substrate was prepared by immersing a $O_2$ plasma pretreated LDPE film into a reaction mixture of 0.10 M aniline and 0.025 M ammonium persulfate in 0.5 M $HClO_4$ for 2 h. The green polyaniline coated film was undoped as described in Example 1. The film was then placed in a degassed solution of vinyl benzyl chloride (0.03 vol. % in ethanol) and exposed to near UV irradiation for 2 h. The film so obtained was washed with a solvent mixture containing DMF and chloroform to remove the homopolymers as well as unreacted vinyl benzyl chloride. The grafted film was reacted with 4,4'-bipyridine and benzyl chloride as described in Example 1, and then dried under reduced pressure. The film has a Rs of $10^{10}$ Ω/sq. before irradiation which subsequently decreased to $10^6$ Ω/sq. upon exposure to near UV-irradiation for 70 min.

Example 4

Vinyl benzyl chloride grafted films were synthesized by placing the monomer on both surfaces of an argon plasma pretreated LDPE film, sandwiching the film between two quartz plates, and exposing the assembly to near UV-irradiation for a period of 45 minutes at room temperature. The grafted film was reacted with 4,4'-bipyridine and benzyl chloride, and further coated with polyaniline (emeraldine state) as described in Example 1. The Rs of the film decreased from 101 Ω/sq. to $10^5$ Ω/sq. upon exposure to near UV-light for 10 minutes.

Example 5

Polyaniline (emeraldine) was synthesized via the oxidative polymerization of aniline using ammonium persulfate in 0.5 M $H_2SO_4$ (A. G. MacDiarmid et al. Synth. Met. 69, 285 (1987)). The polyanilne powder was undoped using excess 0.5 M NaOH. The base powder was blended with 20 wt. % of monomeric benzyl viologen dichloride, and a freestanding film of approximately 10 μm was cast using 10 wt. % of blend in N-methyl pyrrolidinone (NMP). The Rs of the film decreased from $10^{10}$Ω/sq. to $10^7$ Ω/sq. upon irradiation with near UV-light for 2 h.

Example 6

Viologen grafted film was synthesized as described in Example 2. The film so obtained was immersed into a reaction mixture containing 0.08 M pyrrole and 0.025 M ammonium persulfate in 0.15 M hydrochloric acid for 2 h. The polypyrrole film was undoped in 0.5 M NaOH for 2 h, washed with deionized water and dried under reduced pressure. The Rs of the film decreased from $10^8$ Ω/sq. to $10^6$ Ω/sq. upon exposure to UV-irradiation for 75 min.

Finally, it is to be understood that various alterations, modifications and/or additions may be made without departing from the spirit of the present invention as outlined herein.

The invention claimed is:

1. A method for preparing an electrically conductive polymeric material comprising:
   a) providing a vinyl benzyl halide grafted film substrate;
   b) reacting the vinyl benzyl halide grafted film with an equimolar mixture of 4,4' bipyridine and p-xylene dihalide to form a viologen salt-grafted film;
   c) coating the viologen salt-grafted film with polyaniline to form a polyaniline-coated film; and
   d) exposing the polyaniline-coated film to near-ultraviolet radiation to obtain an electrically conductive polymer.

2. A method for preparing an electrically conductive polymeric material comprising:
   a) contacting a polymeric material with at least one viologen salt to form a pre-doped composition, wherein said polymeric material is capable of exhibiting electrical conductivity upon oxidative doping, by forming the viologen salt in situ on a substrate to obtain a viologen-salt coated substrate and then forming the polymeric material in situ on the viologen-salt coated substrate; and
   b) irradiating the pre-doped composition with electromagnetic radiation, thus producing an electrically conductive polymeric material.

3. The method according to claim 2, wherein the electromagnetic radiation is of one or more UV or near UV wavelengths.

4. The method according to claim 2, wherein a mixture of viologen salts is formed upon the substrate.

5. The method according to claim 2 wherein at least one of the 1,1'-substituents of the viologen salt are independently selected from an alkyl group or a benzyl group.

6. The method according to claim 2 wherein the at least one viologen salt formed is a polymeric viologen salt.

7. The method according to claim 6, wherein the viologen salt moiety is present in the backbone of the polymeric viologen salt.

8. The method according to claim 6, wherein the viologen salt moiety is present as a side chain of the polymeric viologen salt.

9. The method according to claim 2, wherein the viologen salt is a viologen dihalide.

10. The method according to claim 6, wherein the viologen salt is a viologen dihalide.

11. The method according to claim 2 wherein the polymeric material is polyaniline, a polyaniline derivative, polypyrrole, a polypyrrole derivative or a mixture of at least two compounds selected from the group consisting of a polyaniline, a polyaniline derivative, a polypyrrole and a polypyrrole derivative.

12. The method according to claim 2, wherein the irradiation step is conducted at a temperature of 0° C. to approximately 80° C. in the presence of air and in the absence of any solvent.

13. The method according to claim 2, wherein the viologen-salt bearing substrate is made by a method comprising:
   i) providing a vinyl alkyl halide grafted low density polyethylene film substrate;
   an alkyl halide; and
   4,4'-bipyridine;
   ii) contacting the grafted film substrate with the 4,4'-bipyridine for a time sufficient to permit reaction therebetween forming a modified grafted film substrate;
   iii) subsequently contacting the modified grafted film substrate with the alkyl halide for a time sufficient to permit the formation of a viologen-salt grafted film.

14. A method for preparing an electrically conductive polymeric material comprising:
   a) contacting a polymeric material with at least one viologen salt to form a pre-doped composition, wherein said polymeric material is capable of exhibiting electrical conductivity upon oxidative doping, by forming the polymeric material in situ on a substrate to obtain a polymer coated substrate and then forming the viologen salt in situ on the polymer coated substrate; and
   b) irradiating the pre-doped composition with electromagnetic radiation, thus producing an electrically conductive polymeric material;
   wherein both of the polymer and viologen salt are formed in situ by a method comprising:
   i) providing a low density polyethylene film substrate; a solution of aniline or pyrrole; ammonium persulfate; a vinyl alkyl halide or vinyl benzyl halide; an alkyl halide; and 4,4'-bipyridine;
   ii) immersing the polyethylene film substrate into the solution of aniline or pyrrole and ammonium persulfate for a period sufficient to form a polymeric coating on the substrate;
   iii) contacting the coated substrate with the vinyl alkyl halide or vinyl benzyl halide;
   iv) subjecting the mixture to UV or near UV irradiation for a time sufficient to form a vinyl alkyl halide or vinyl benzyl halide grafted substrate; and
   v) forming the viologen salt on the vinyl alkyl halide or vinyl benzyl halide grafted substrate via reaction with 4,4' bipyridine and an alkyl halide.

* * * * *